(12) United States Patent
Ball et al.

(10) Patent No.: US 7,831,054 B2
(45) Date of Patent: Nov. 9, 2010

(54) VOLUME CONTROL

(75) Inventors: Steven J. Ball, Seattle, WA (US); Annette M. Crowley, Bellevue, WA (US); Frank D. Yerrace, Woodinville, WA (US); Mitchell K. Rundle, Bellevue, WA (US); Patrick M. Baudisch, Seattle, WA (US); Elliot Omiya, Kirkland, WA (US); Stephen Smith, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1335 days.

(21) Appl. No.: 11/170,286

(22) Filed: Jun. 28, 2005

(65) Prior Publication Data

US 2006/0291666 A1 Dec. 28, 2006

(51) Int. Cl.
*H03G 3/00* (2006.01)
(52) U.S. Cl. .................... 381/104; 381/107; 381/109; 381/61
(58) Field of Classification Search ................. 381/104, 381/107–109, 61, 94.5; 700/94; 715/727; 84/633
See application file for complete search history.

(56) References Cited

U.S. PATENT DOCUMENTS 5,191,620 A * 3/1993 Lee ............................ 381/105

(Continued)

FOREIGN PATENT DOCUMENTS

JP 2001-356854 A 12/2001

OTHER PUBLICATIONS

Patrick Baudisch, John Pruitt, and Steve Ball, Flat Volume Control: Improving Usability by Hiding Volume Control Hierarchy in the User Interface, CHI 2004, Apr. 24-29, 2004, Vienna, Austria.

(Continued)

*Primary Examiner*—Xu Mei

(57) ABSTRACT

A volume control may be provided with some integrated graphical indication of the presence and/or level of an audio signal that it controls. For example, a slider-type volume control may be provided with a signal meter within the slider itself. A volume control may be provided with a mechanism for showing the non-mute volume control level of a volume when the volume control is muted. For example, a slider-type volume control may display a ghosted slider tab at the level of volume control in effect before muting while at the same time displaying a regular slider tab at a muted level. A user may be able to glance at a volume control and quickly and intuitively understand aspects of the volume control's state such as the level and condition of the signal that is flowing through or blocked by (if muted) the control.

19 Claims, 17 Drawing Sheets

U.S. PATENT DOCUMENTS

| | | | |
|---|---|---|---|
| 5,559,301 A * | 9/1996 | Bryan et al. | 84/653 |
| 5,640,176 A * | 6/1997 | Mundt et al. | 715/839 |
| 5,826,064 A | 10/1998 | Loring et al. | |
| 6,256,027 B1 * | 7/2001 | Jeong et al. | 715/788 |
| 6,704,413 B1 | 3/2004 | Weeks et al. | |
| 6,747,678 B1 * | 6/2004 | Katayama et al. | 715/773 |
| 6,996,445 B1 * | 2/2006 | Kamijo | 700/94 |
| 7,088,834 B2 * | 8/2006 | Takemoto et al. | 381/104 |
| 7,216,221 B2 * | 5/2007 | Bear et al. | 713/1 |
| 7,278,101 B1 * | 10/2007 | Cassezza | 715/716 |
| 7,319,761 B2 * | 1/2008 | Bianchi et al. | 381/56 |
| 7,319,764 B1 * | 1/2008 | Reid et al. | 381/104 |
| 7,343,210 B2 * | 3/2008 | DeVito et al. | 700/94 |
| 7,390,957 B2 * | 6/2008 | Iwata | 84/633 |
| 7,502,480 B2 * | 3/2009 | Baudisch et al. | 381/104 |
| 2004/0230916 A1 | 11/2004 | Salvatori et al. | |
| 2005/0025320 A1 | 2/2005 | Barry | |
| 2007/0195975 A1 * | 8/2007 | Cotton et al. | 381/104 |
| 2008/0002844 A1 * | 1/2008 | Chin | 381/310 |

OTHER PUBLICATIONS

Mark Hennessy, Mark's Project Pages, Hi-Fi Preamp—User-Interface, http://wwww.mhennessy.f9.co.uk/preamp/interface.htm, © 2004 Mark Hennessy.

Volume.app A simple volume control, http://volume-app.sourceforge.net/, 2005.

VolumeControl 2.2, http://www.freetrialsoft.com/volumcontrol-review-872.html, © 2004, Acoll Software.

* cited by examiner

VOLUME CONTROL

BACKGROUND

Many devices with displays use graphical user interfaces to display information to a user and to allow a user to interact with and control the device. Although computers commonly employ graphical user interfaces many other types of devices also may use graphical user interfaces. For example cell phones, household appliances, portable music and video players, consoles for sound studios, to name a few examples. Many of these types of devices include a graphical user interface element, often called a volume control, with which a user can control the volume of an audio signal or the loudness of sound generated by a device.

FIG. 1 shows an example of one type of volume control 100. A volume control may be situated in an audio signal path, which in FIG. 1 includes an upstream audio path 102 and a downstream audio path 104. Volume control 100 regulates an audio signal flowing between the upstream audio path 102 and the downstream audio path 104. A typical audio path in a computer may include: a microphone, a hardware switch; a sound card; a digital signal processor for noise filtering, amplification, etc.; an application with an acoustic echo cancellation and an automatic gain control; a mixer, possibly in software; an amplifier; and a medium for capturing a signal or speakers for producing sound. In FIG. 1 the upstream audio path 102 could be, for example, an application or a sound card or anything producing an audio signal. The downstream audio path 104 could be a mixer, an application for playing sound (e.g. a media player), etc. The upstream audio path 102 could be the input for a media player and the downstream audio path 104 could be anything receiving the media player's audio output. In simpler devices a volume control and its place in an audio path may be less distinct. The exact nature of the source and destination of an audio signal is not particularly important; a volume control can control any audio signal.

A volume control such as volume control 100 is usually a part of a larger graphical user interface or windowing system, which, for simplicity, is not shown in FIG. 1. As with many graphical user interfaces and elements, volume widget or volume control 100 has a part that the user sees and may interact with—volume control interface 106. Volume control 100 also has a control or logic part—volume control logic 108. The volume control logic 104 may be thought of as the "intelligence" of the volume control 100, and may maintain and manage state information, interaction rules, audio signal input and output, methods for the volume control 100, and so on. Typically, volume control logic 108 will maintain an audio level setting, for example in the form of a variable or property, which might control the volume or loudness of the audio signal being regulated by the volume control 100. The figure of volume control interface 106 is self-explanatory. A slider 110 may be interacted with to change the setting maintained by volume control logic 108. The slider 110 might be automatically moved by the volume control logic 108 to reflect changes in the audio level setting. A mute checkbox 112 may be checked and unchecked to mute and unmute the volume control 100. The volume control logic 108 may automatically move the slider 110 to reflect changes to the audio level setting. A numerical element 114 may present the audio level setting in textual form. The slider 110 or equivalent may serve the function of an audio level setting.

A user operates volume control 100 as follows. The user slides slider 110, perhaps by dragging a mouse, by clicking keys on a keyboard, by clicking keys on a keypad, by activating a software button, by pushing a hardware button, by rolling a hardware thumbwheel, by speaking a command, etc. In response slider 110 slides on a display, the audio level setting changes accordingly, and the volume or loudness of the audio signal is increased or decreased. Activation of the mute checkbox 112 will set the audio level setting to zero or some other pre-determined low-level setting.

Volume control 100 is only one example of a volume control. Volume controls can have a very wide range of appearances and behavioral attributes for controlling an audio level. Some other forms of volume controls are discussed herein but the exact form of a volume control is open-ended.

FIG. 2 shows various places in an audio system where a volume control may be used. Many computers have applications 120 that generate or receive audio data and feed audio signals into sound card channels 122 which in turn pass audio signals through (or are regulated by) a master volume control 124 which attenuates or amplifies a final mixed signal before it is sent to a power amplifier and loudspeaker(s). As seen in FIG. 2, volume controls may be used at any of these parts of the audio path.

SUMMARY

The following summary is included only to introduce some concepts discussed in the Detailed Description below. This summary is not comprehensive and is not intended to delineate the scope of protectable subject matter.

A volume control may be provided with some graphical indication of the presence and/or level of an audio signal that it controls. For example, a slider-type volume control can be provided with a signal meter within the slider. A volume control may be provided with a mechanism for showing the non-mute volume control level of a volume when the volume control is muted. For example, a slider-type volume control may display a ghosted slider tab at the level of volume control in effect before muting while at the same time displaying a regular slider tab at a muted level. Thus, it may be easier for a user to glance at a volume control and quickly understand aspects of the volume control's state.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

DETAILED DESCRIPTION

Overview

It has not previously been observed that volume controls are sometimes unintuitive in appearance or behavior. Interaction with a volume control may require more cognition, knowledge, and attention than necessary. It has also not previously been observed that the appearance of a volume control may not convey to a user some useful information about the state of the control itself or of the signal(s) flowing through the volume control, which, for example, can unnecessarily complicate the process of changing or debugging an application's or device's sound production process. It has also not been observed that volume controls are often used at times when users are concerned with solving a loudness problem, where something is either too loud or too soft—a volume control can serve as a means to solve a loudness problem.

The following description discusses various types of audio signal indications and how they may be integrated with volume controls. The following description also discusses how a volume can indicate muting in a way where a mute state may interact with and may be conveyed by the control itself. Other embodiments and variations are also discussed.

Before proceeding, it should be noted that the term "volume" is used broadly herein. Some volume controls may regulate a ratio or intensity of an audio signal directly and volume may be a product of an audio control level that varies over a range, for example 1 to 10, or 0 to 100 percent, etc. Some volume controls may regulate a loudness factor which is closely correlated with an actual sound level (e.g. decibel level) that is expected to be produced by a device. As used herein, volume, audio level, and signal level are defined broadly to mean either audio signal intensity, a metric correlated to audio signal intensity, or a measure or factor of the degree of loudness of sound expected to be produced from an audio signal. Sound may be produced by one or more speakers, soundboards, speaker arrays, ultrasonic transducers, or other sound producers. Volume can refer to the volume of an audio signal or the volume of a component of an audio signal or a frequency band of an audio signal.

Audio Signal Indications

Figure 1:
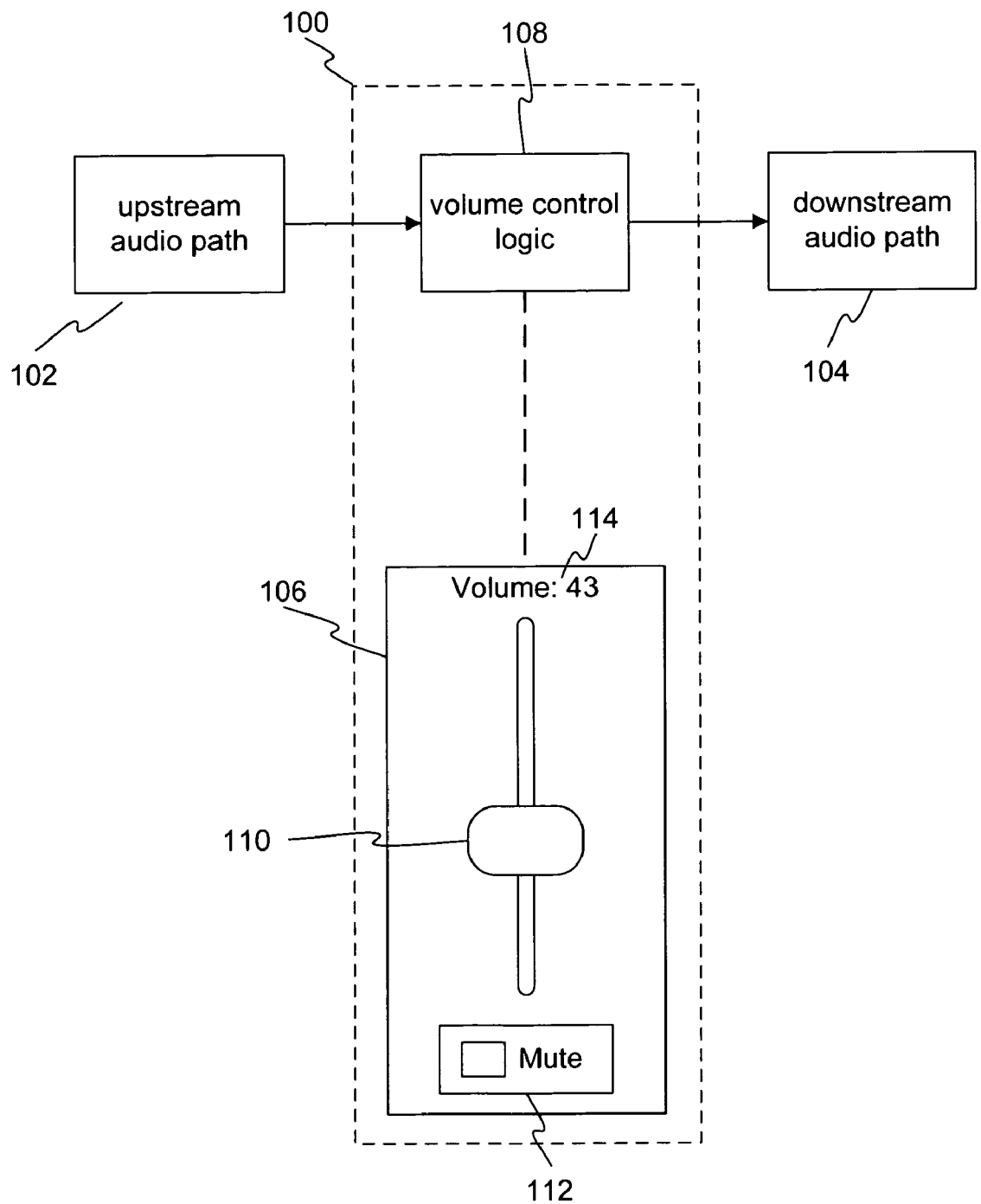
FIG. 1 shows an example of one type of volume control.
Figure 2:
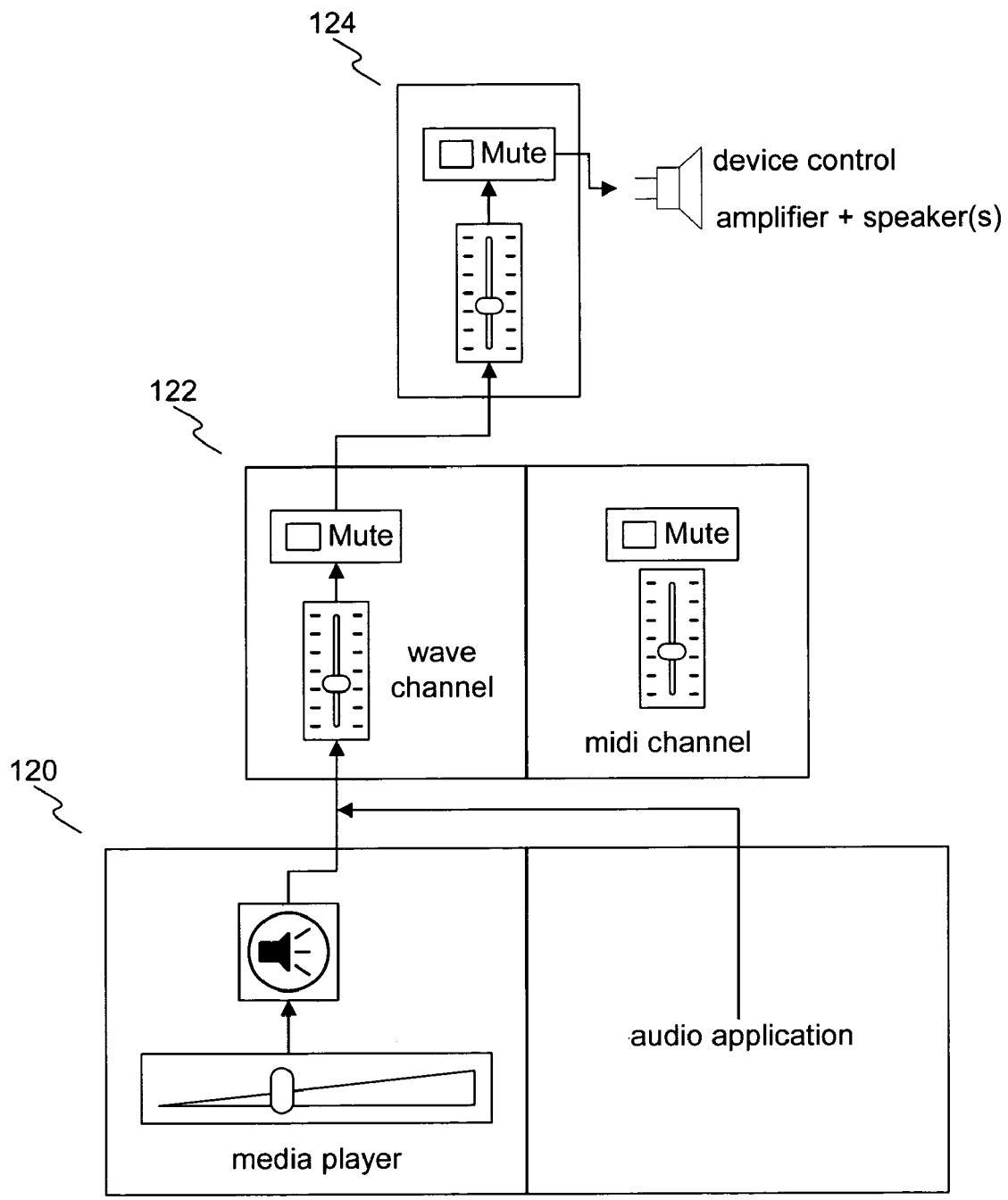
FIG. 2 shows various places in an audio system where a volume control may be used.
Figure 3:
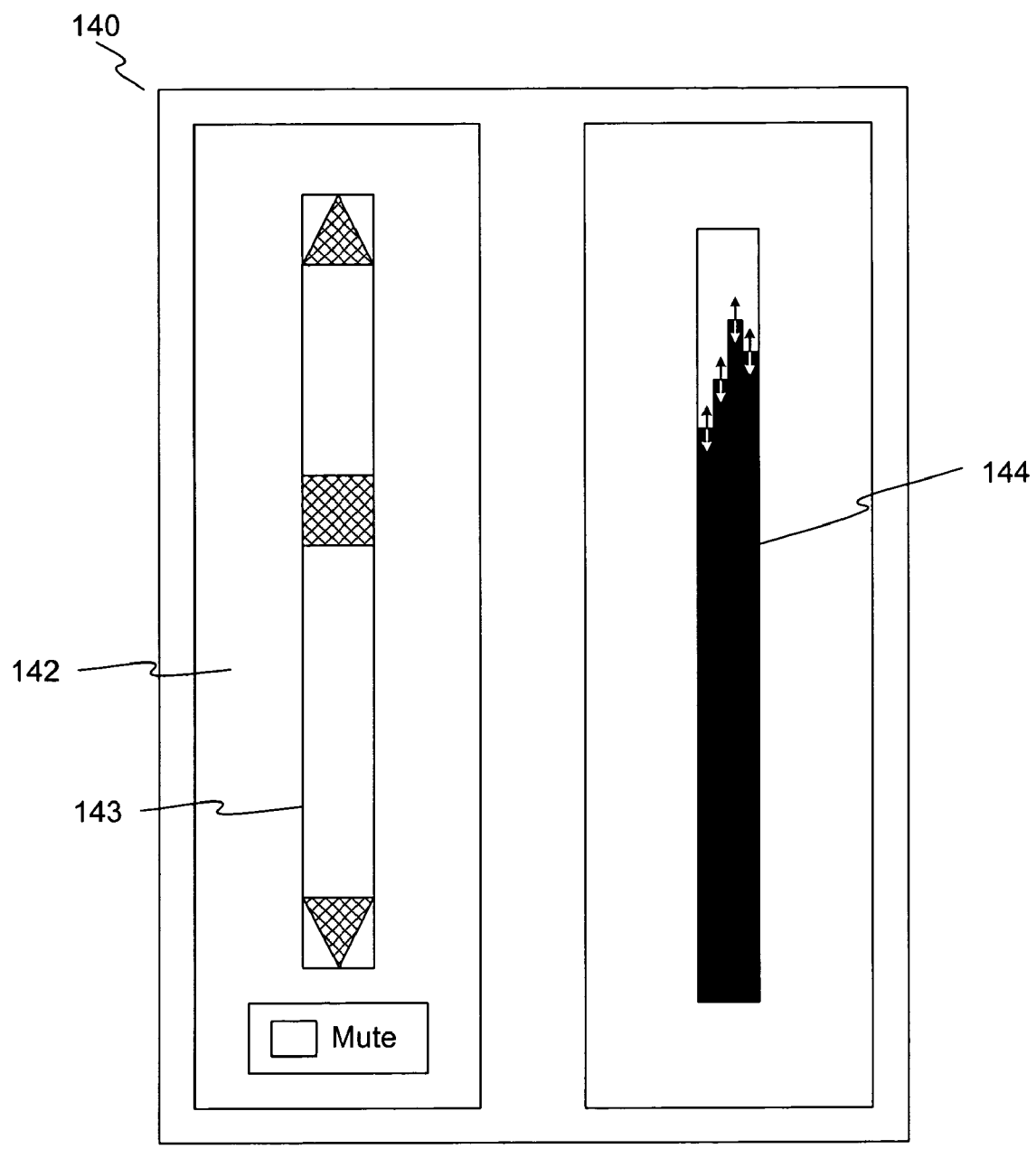
FIG. 3 shows a user interface of a traditional volume control for a generic application or device where the volume control is completely separated from and independent of its metering or activity indicator or element.

FIG. 3 shows a user interface 140 of a traditional volume control 142 for a generic application or device where the volume control 142 is separated from and independent of its metering or activity indicator or element 144. User interface 140 has a volume control 142 and a separate, detached metering element 144, perhaps at a location of the user interface 140 well removed from the volume control 142. A slider 143 controls the volume of an audio signal associated with the volume control 142. The metering element 144 has one or more bars that fluctuate in length with changes in the intensity (either incoming or as controlled) of the audio signal or respective portions thereof. As the intensity of the audio signal increases and decreases the bars will move upward and downward. If the metering element 144 is not displayed then the user cannot tell if the volume control 142 or application is receiving an audio signal. If a host device is not producing audible sound then the user cannot tell at a glance if the problem lies before the application, or with the attached speaker or amplifier. For example, if the volume control 142 is associated with a microphone and no sound is being heard, the user cannot readily tell if the microphone is producing a signal. Even if the metering element 144 is displayed it is separate and apart from the volume control 142 and a person looking at user interface 140 is required to direct their focus and attention to two different elements to understand the application's state. Furthermore, the metering element 144 occupies an area of display "real estate" that could be used for other purposes.

Figure 4:
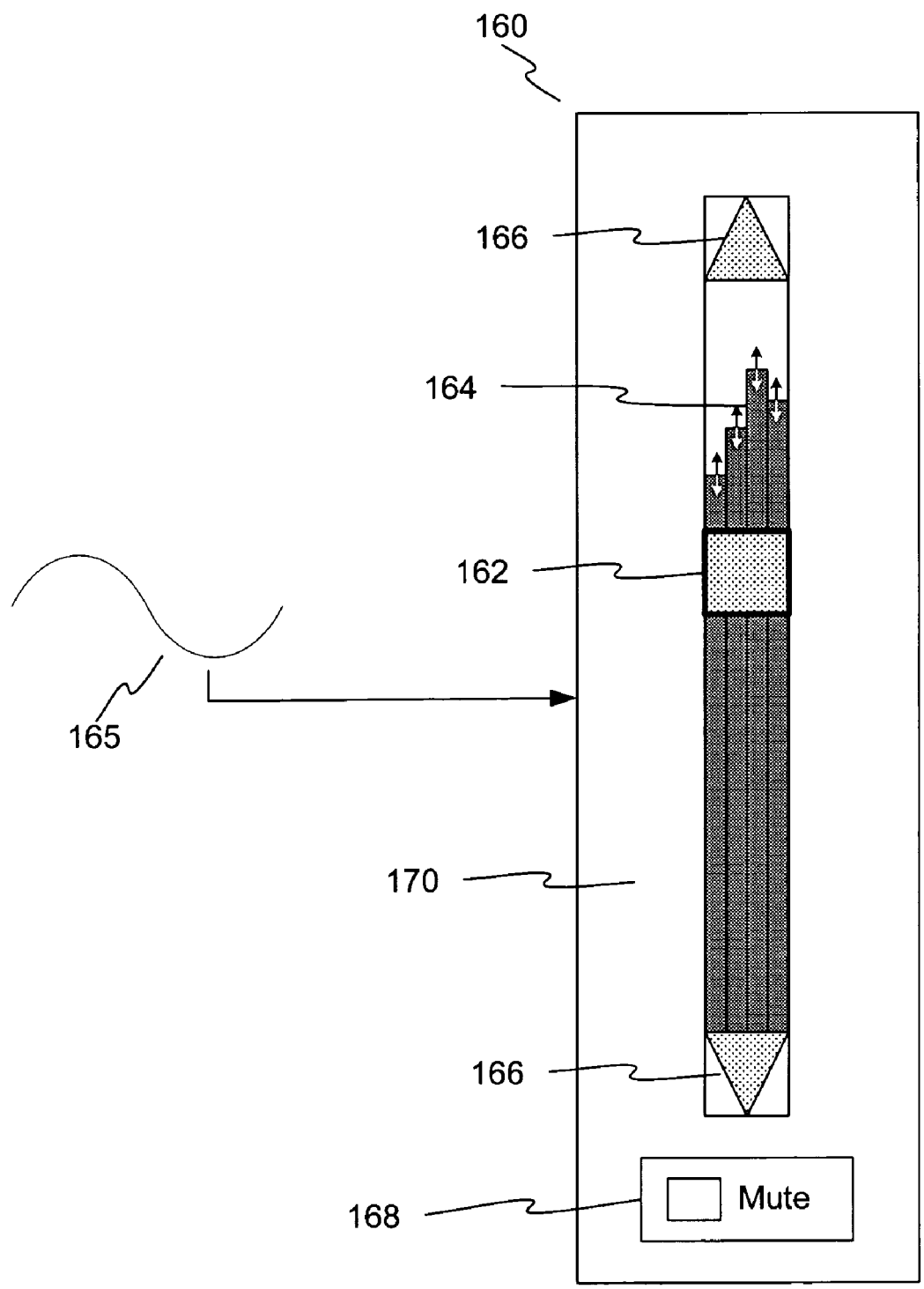
FIG. 4 shows a volume control with an integrated audio signal indicator.

FIG. 4 shows a volume control 160 with an integrated audio signal indicator. Volume control 160 has a slider 162 united with an audio signal indicator, in this example a metering indicator 164. The color, brightness, shape, length, size, etc. of a portion of the slider 162 may change with audio signal's 165 fluctuations. The slider 162 may be dragged or may be changed using buttons 166 (buttons 166 are optional). The volume control 160 shows the presence and/or the activity of the audio signal 165 but with a reduced display footprint. The audio signal 165 itself appears to flow through the slider volume control 160 directly, as if the volume control 160 were a transparent pipe carrying water and as if the slider 162 were a valve or regulator controlling the flow of the water. Furthermore, the integrated or embedded nature of a signal activity indicator indicates there is audio activity occurring before this control, and with one glance of the volume control 160 itself, a user can quickly determine both whether the volume control 160 is receiving an audio signal and what the volume control state is, e.g. what level is the volume control 160 set to, optionally whether it is muted etc. If a host device is not outputting sound the user can quickly tell if the problem lies at or before the volume control 160 or its application or supplier. The graphic display of the slider 162 includes the audio signal indication. If a user were to click or drag on the metering area 164 the slider 162 would receive the input and slide accordingly. That is to say, an indication such as metering can be incorporated into a part of the volume control that is directly receptive to and responsive to user input. The metering area 164 and the slider 162 together might be referred to as a metered slider, a slide-meter, a metering volume control, etc. In the case of a slider-like control, the slider 162 with its signal indication can itself be considered to be the volume control; a mute control 168 and framing display area 170 are not needed.

Figure 5:
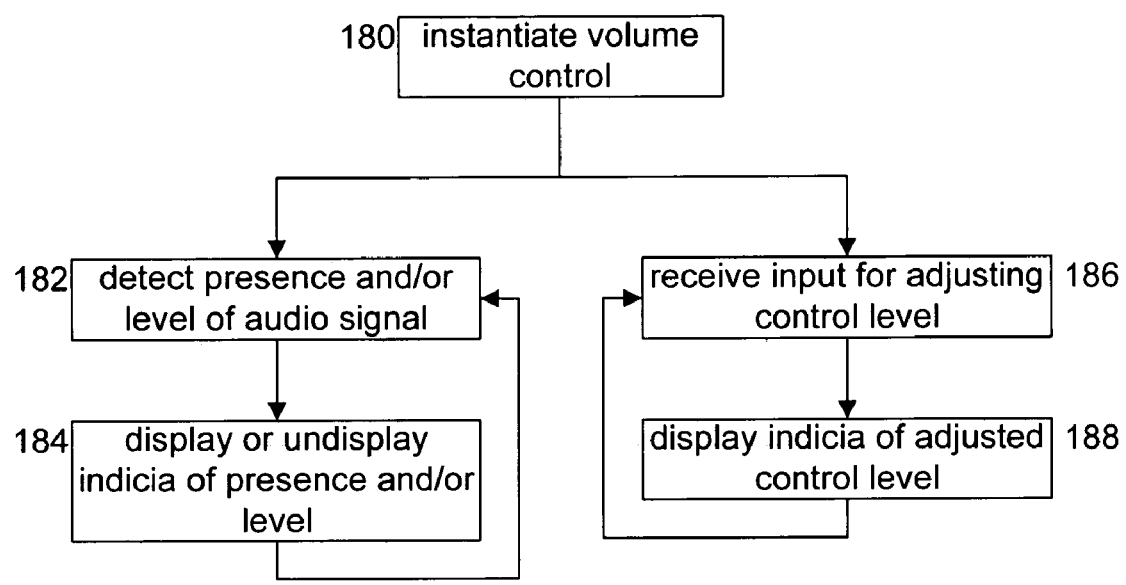
FIG. 5 shows a process for displaying a volume control with an integrated audio signal graphic.

FIG. 5 shows a process for displaying a volume control with an integrated audio signal graphic. After being instantiated 180, a volume control's logic can proceed along two parallel threads. A first thread detects 182 the presence and/or the level of the audio signal being controlled by the volume control. Indication of the presence or level is displayed or undisplayed 184 accordingly. Steps 182 and 184 are repeated, resulting in an indication that changes with the audio signal associated with the volume control. A second thread receives 186 input for adjusting the volume control's control level. For example, a drag input or some automated control signal may change the control level from 50% to 90%. The volume control's indication of the control level is displayed 188 at the adjusted control level. For example, a slider bar at the upper 90% of its range of motion, a textual "90", etc. Steps 182 to 188 can be performed in any order. The result is a volume control that can both display indication of the audio signal and control/display the volume of the audio signal.

Figure 6:
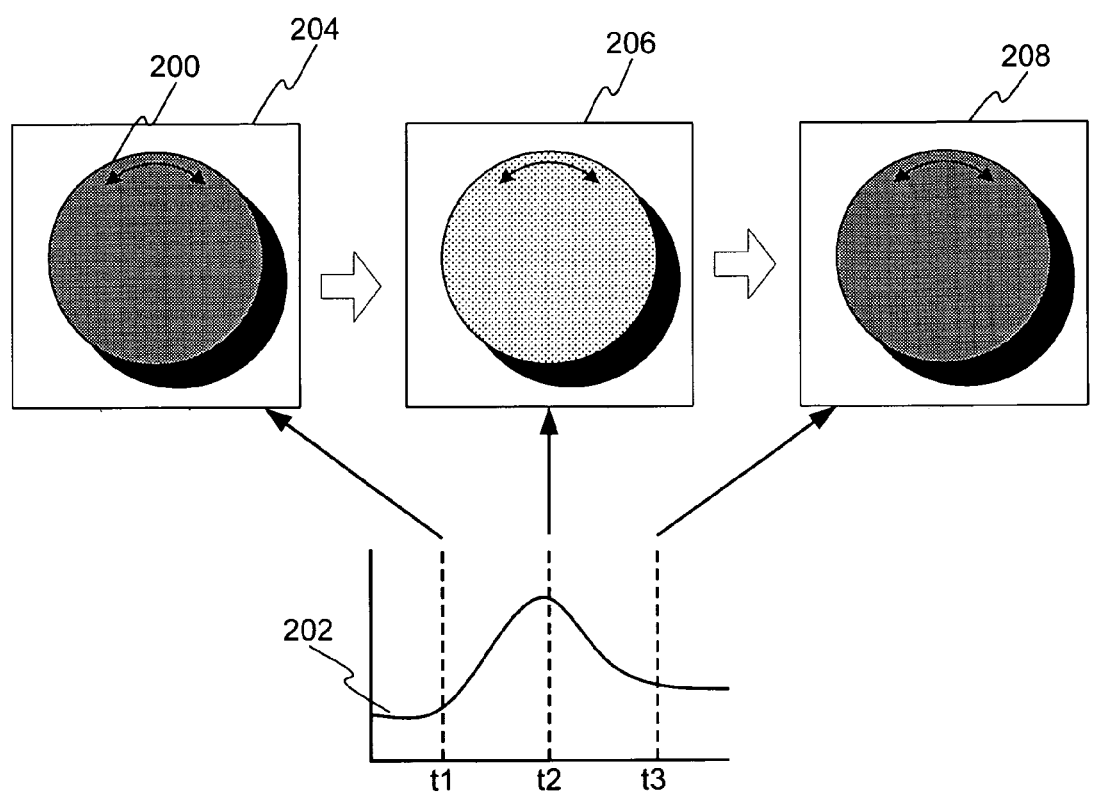
FIG. 6 shows another example of a volume control with integrated audio signal graphics.

FIG. 6 shows another example of a volume control with integrated audio signal graphics. In FIG. 6 the volume control is in the form of a rotatable dial 200. The rotatable dial 200 can be rotated by the user to alter a control level or volume of an audio signal 202. FIG. 6 shows how the appearance (e.g., intensity, glow, color, brightness, line appearance, shape, size, or other visual indicator) of the rotatable dial 200 can change over time to reflect signal activity. For example, at time t1 rotatable dial 200 is displayed 204 with a low brightness corresponding to the low intensity level of the audio signal 202 at time t1. At time t2 rotatable dial 200 is displayed 206 with higher brightness corresponding to the higher intensity level of the audio signal 202 at time t2. At time t3 rotatable dial 200 is displayed 208 with a low brightness corresponding to the low intensity level of the audio signal 202 at time t3. During any of this time rotatable dial 200 can be rotated to adjust the volume of the audio signal 202. Even if the dial is set to zero and is passing no signal to a listening device, the user will be able to tell that there is signal activity in the channel before the control (rather than being in a completely "off" state.)

Figure 7:
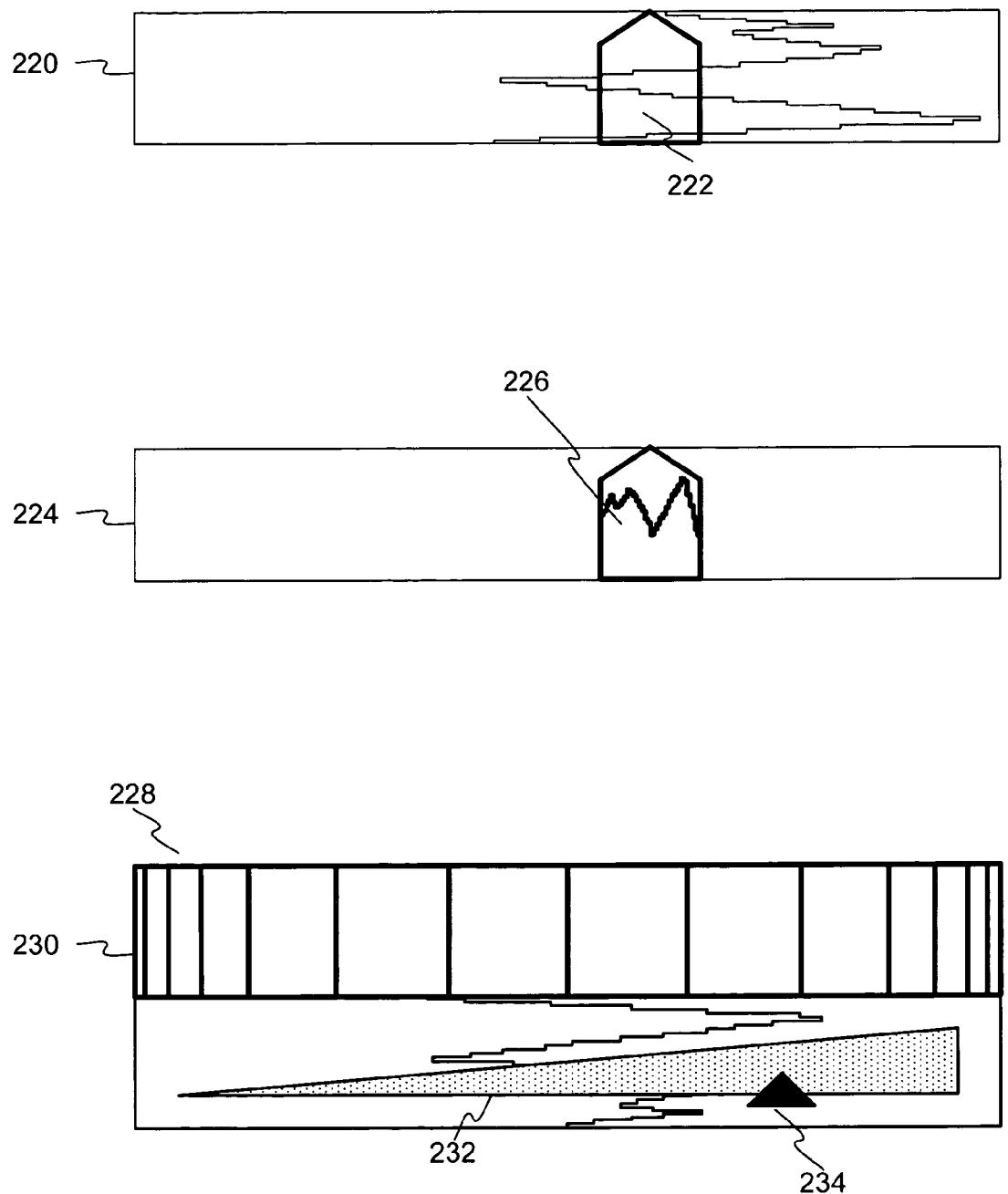
FIG. 7 shows some other examples of volume controls with integrated indication of an attendant audio signal.

FIG. 7 shows some other examples of volume controls with integrated indication of an attendant audio signal. Volume control 220 uses a transparent or semi-transparent slider tab 222. A metering effect or other indication is displayed as if below the slider tab 222. Volume control 224 has a slider tab 226 that actually encapsulates a metering of an audio signal. When slider tab 226 moves the metering moves with it. The audio signal indication need not be part of an interactive portion of a volume control but rather can be incorporated into a portion of the volume control used to indicate the current signal level that is at the audio path before the control. For example, volume control 228 has a virtual thumbwheel 230 for adjusting volume. Volume control 228 also has a level indicator 232 where a marker 234 indicates the current audio level setting and which may be moved according to user rotation of the virtual thumbwheel 230.

Figure 8:
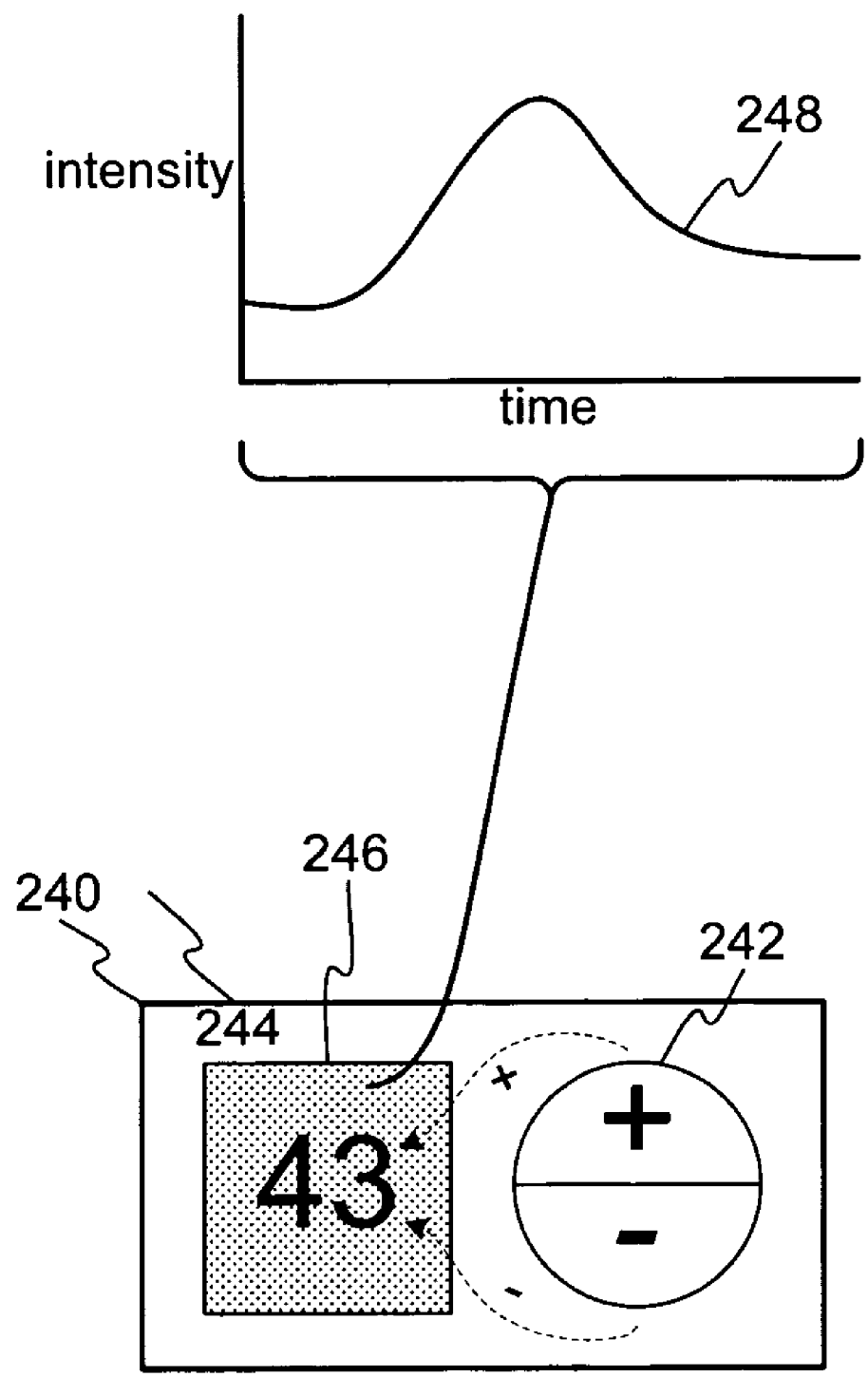
FIG. 8 shows another example of an improved volume control.

FIG. 8 shows another example of an improved volume control 240. In this case volume control 240 has a volume-up button 242 and a volume-down button 244 for increasing and decreasing the volume setting of the volume control 240. The volume setting indication is in the form of a number 246 (e.g. 43%). The number 246 can be varied in brightness, color, font size, font shape, etc. in accordance with variation of the intensity of regulated audio signal 248. In another embodiment the signal indication could be integrated with the buttons 242, 244 and the volume level indicator could be eliminated.

Figure 9:
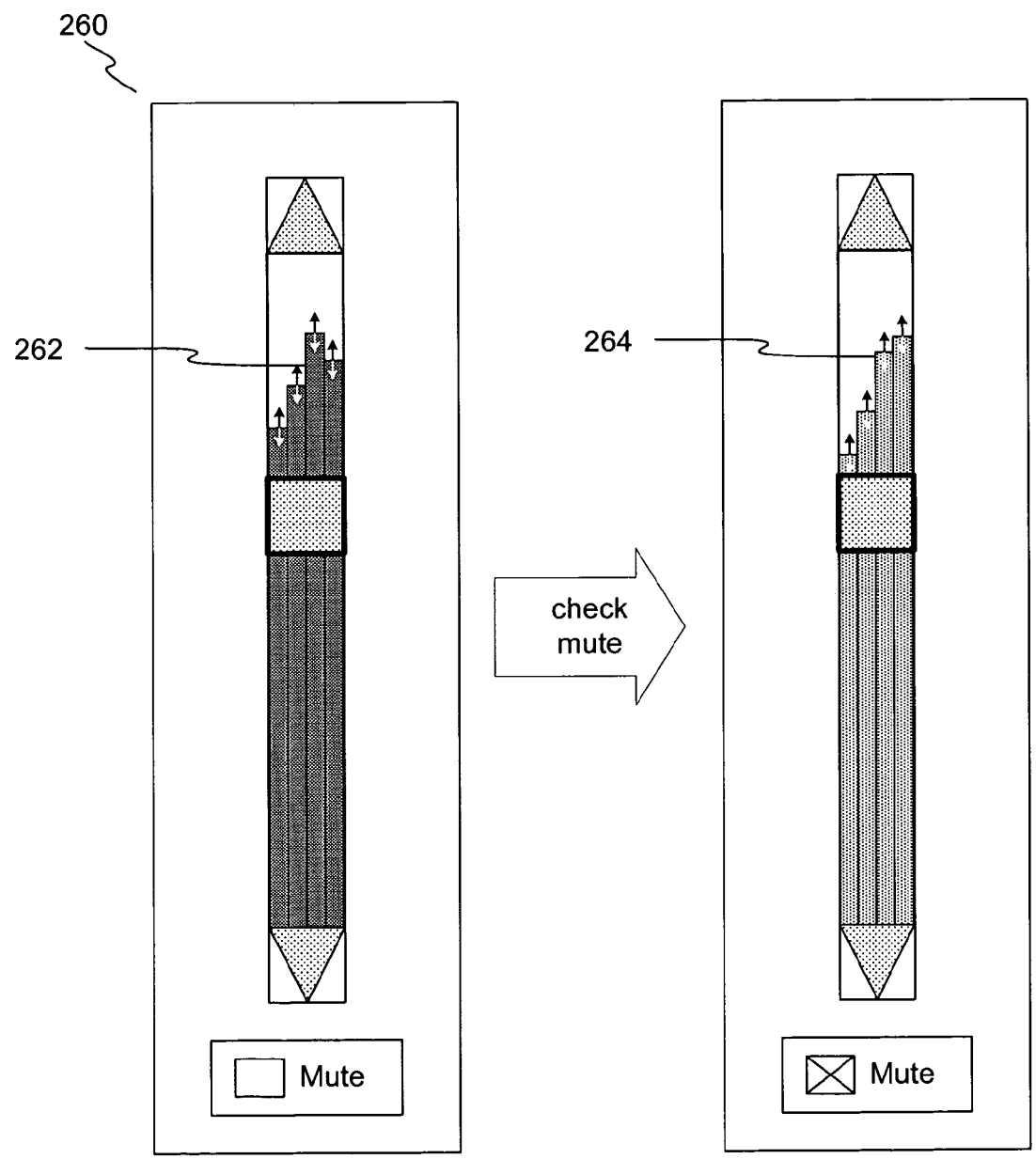
FIG. 9 shows a volume control that displays audio signal indication according to a mute state.

FIG. 9 shows a volume control 260 that displays audio signal indication according to a mute state. In an unmuted state the audio signal indication is displayed with a first color or intensity 262. In a muted state the audio signal indication is displayed with a second color or intensity 264. A user can easily tell if the volume control 260 is in a muted state, even if the volume control 260 does not provide or display a separate or distinct mute checkbox.

Indications of Pre-Muted Control Level

Figure 10:
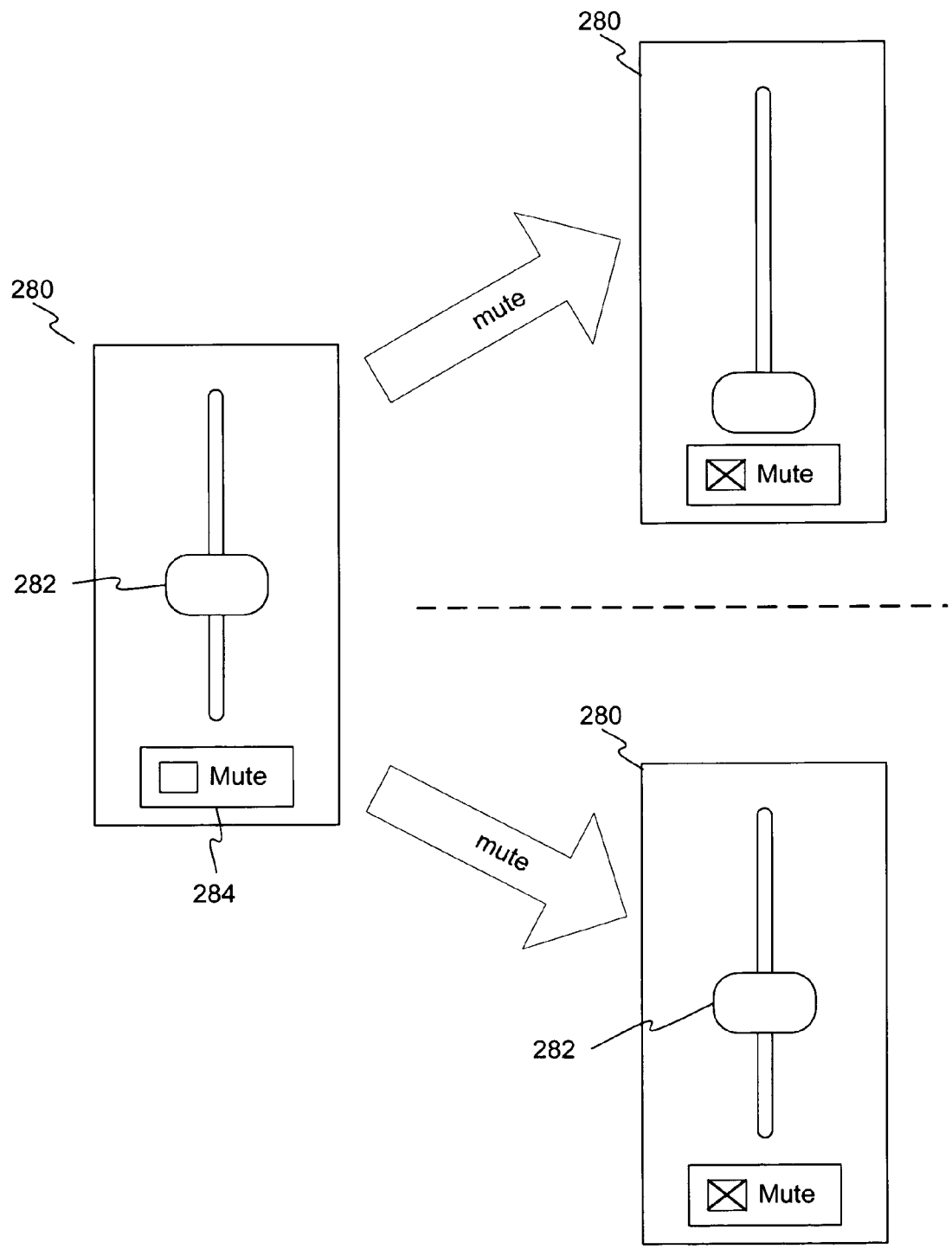
FIG. 10 shows a problem with muting a volume control.

FIG. 10 shows a problem with muting a volume control 280. The volume control 280 starts with a slider tab 282 set to a current setting and its mute button 284 in a deactivated state. In a first approach (upper right portion of FIG. 10), when the mute button 284 is activated the slider tab 282 is automatically moved to its lowest setting to reflect the muted state of the volume control 280. Again, to understand the state of the volume control 280 the user must look at two separate and disjoint interface elements—the mute checkbox and the slider. Furthermore, the mute checkbox consumes space on the display and the user does not know what the volume control's level was set to before the muting or what level it will return to if muting is deactivated—the develops a mental model for audio signal flow, and the user might struggle to understand a complex invisible interaction between a separate mute control and slider control. The mute control overrides the state of the slider control even though there is no direct visual or graphic connection made between the two controls. In a second approach (lower right portion of FIG. 10), when muting occurs the slider tab 282 is left in its original position. This can confuse a user because there is an indication that volume is "on" (per the position of the slider tab 282) and there is a conflicting indication that sound is off per the mute button 284.

Figure 11:
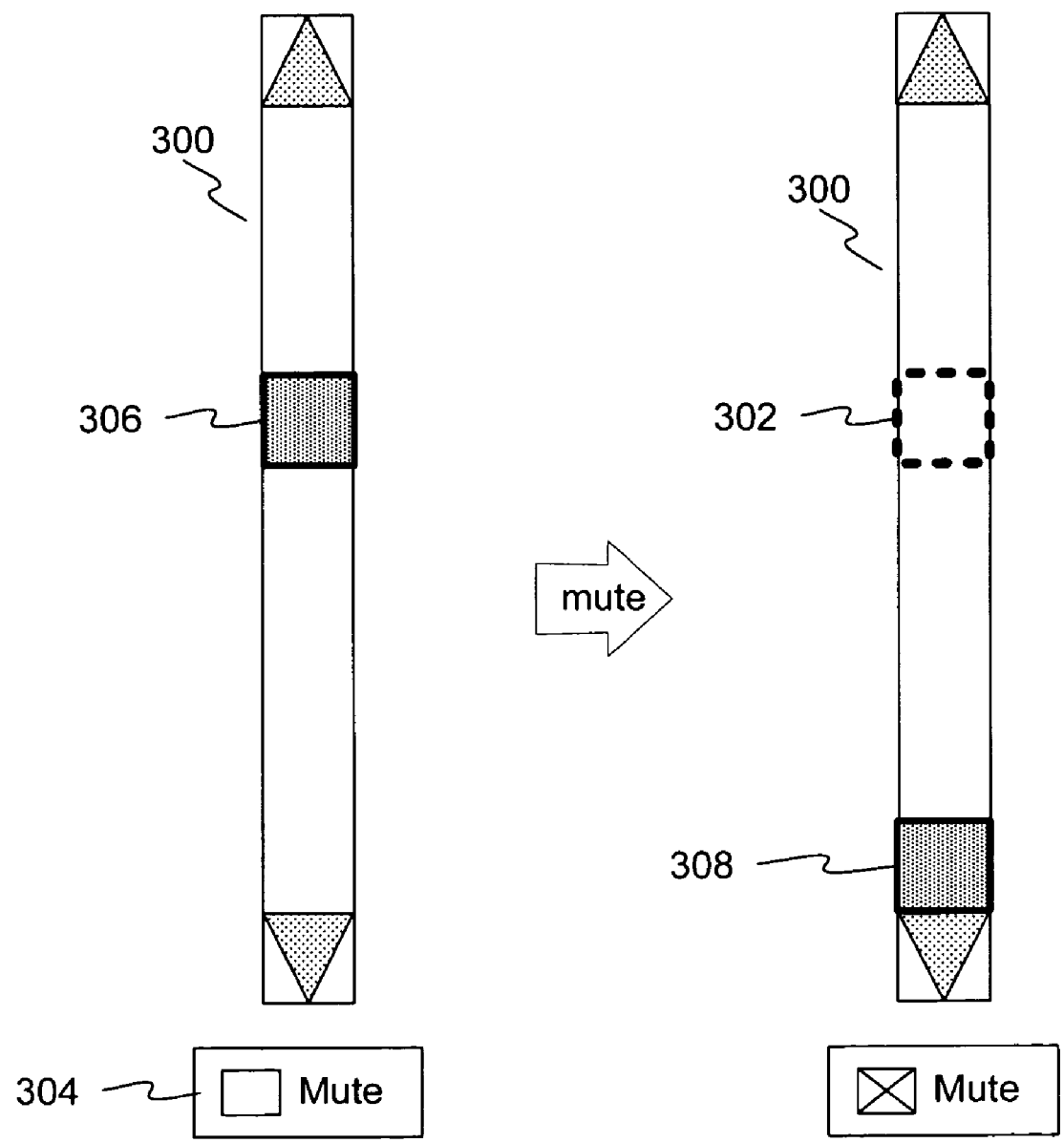
FIG. 11 shows a volume control with an integrated mute indicator.

FIG. 11 shows a volume control 300 with an integrated mute indicator 302. The volume control 300 starts on the left in an unmuted state with unchecked mute control 304 and with a slider at a current control level 306 that controls volume control 300's audio signal. In this embodiment, when muting occurs, for example by checking mute control 304, the slider is displayed at a muted position or level 308 and integrated graphical marker or mute indicator 302 is displayed to indicate the pre-muted control level 306. In the example of FIG. 11, the integrated mute indicator 302 is implemented as a ghosted slider tab, which may be a fainter version of an ordinary slider tab. A graphical element such as a slider tab can be ghosted in a variety of ways, including using transparency, or decreasing the width of its lines, or using dashed lines, or using a faintness effect, or using a lighter color, or using a lower intensity, and so forth. When a user looks at the muted volume control 300 the user can easily tell that the volume control 300 is in a muted state, even if a mute control 304 is not displayed or in proximity with the slider control. The mute state is indicated in both the mute control 304 (if provided) and the slider/volume control 300, regardless of where in the signal path the mute event occurs, because the slider/volume control 300 and mute logic or mute control 304 interact intelligently to convey the dynamic nature of their interdependence.

Figure 12:
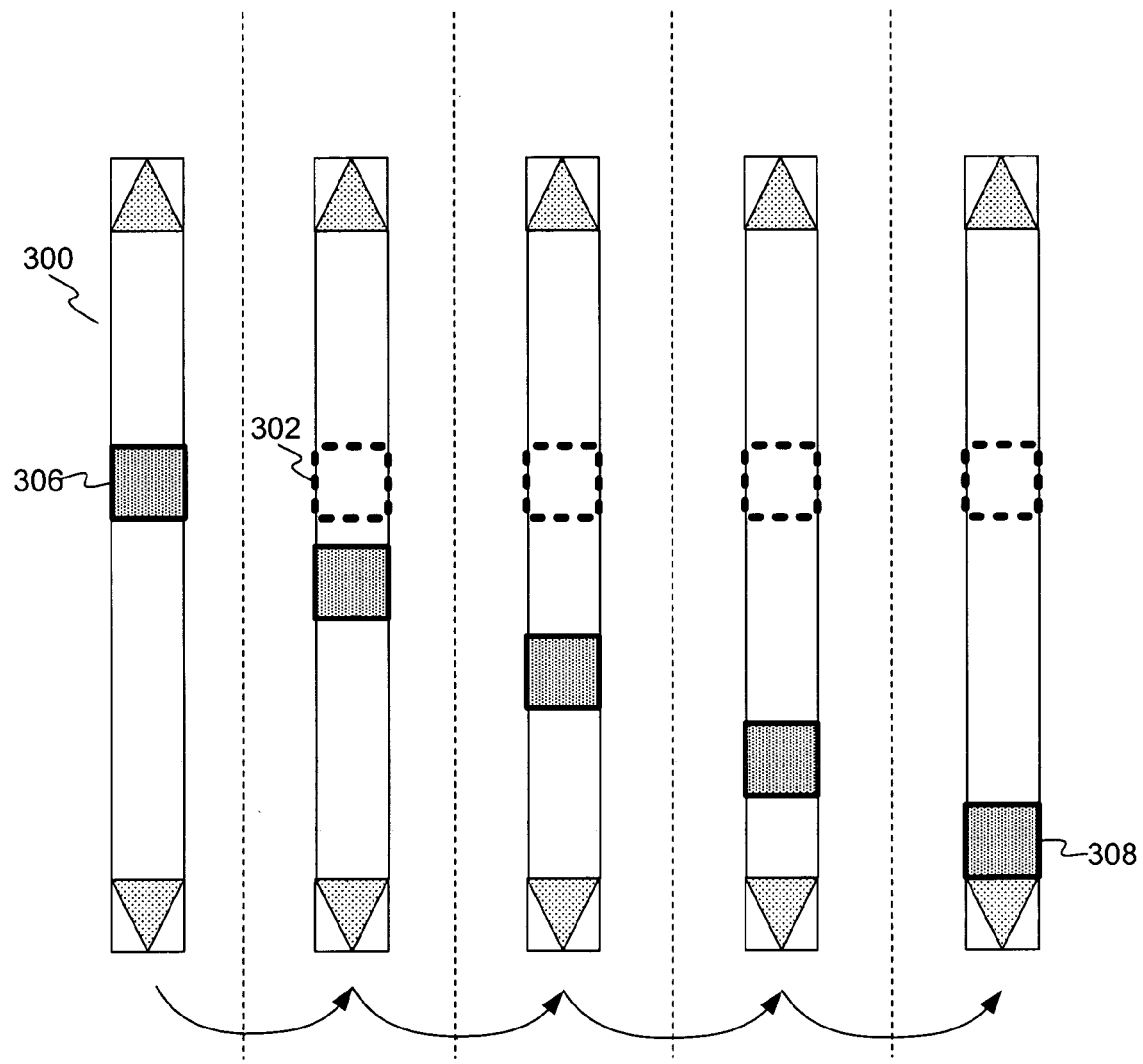
FIG. 12 shows an animated transition to a muted state.

FIG. 12 shows an animated transition to a muted state. FIG. 12 moves chronologically from left to right, starting at a pre-mute state and ending at a mute state. When volume control 300 is muted, for example by input of a mute command, the volume control 300 may be animated such that it automatically moves gradually from the pre-mute position 306 to the muted position 308. In other words, the slider tab appears to slide downward gradually. Subject to implementation, the animation may actually move the slider's tab or it may display a dummy or temporary slider tab. The volume of the signal regulated by the volume control 300 may also be gradually transitioned to the muted level, in which case, if the audio path after the volume control 300 happens to be audibly outputting the signal then a user may hear the volume of the signal gradually lower to the muted level. This type of gradual transition can be optionally used with any of the volume control embodiments discussed herein. Forms of control other than a slider may also be animated in similar fashion (e.g., gradual automated rotation of a control knob).

Figure 13:
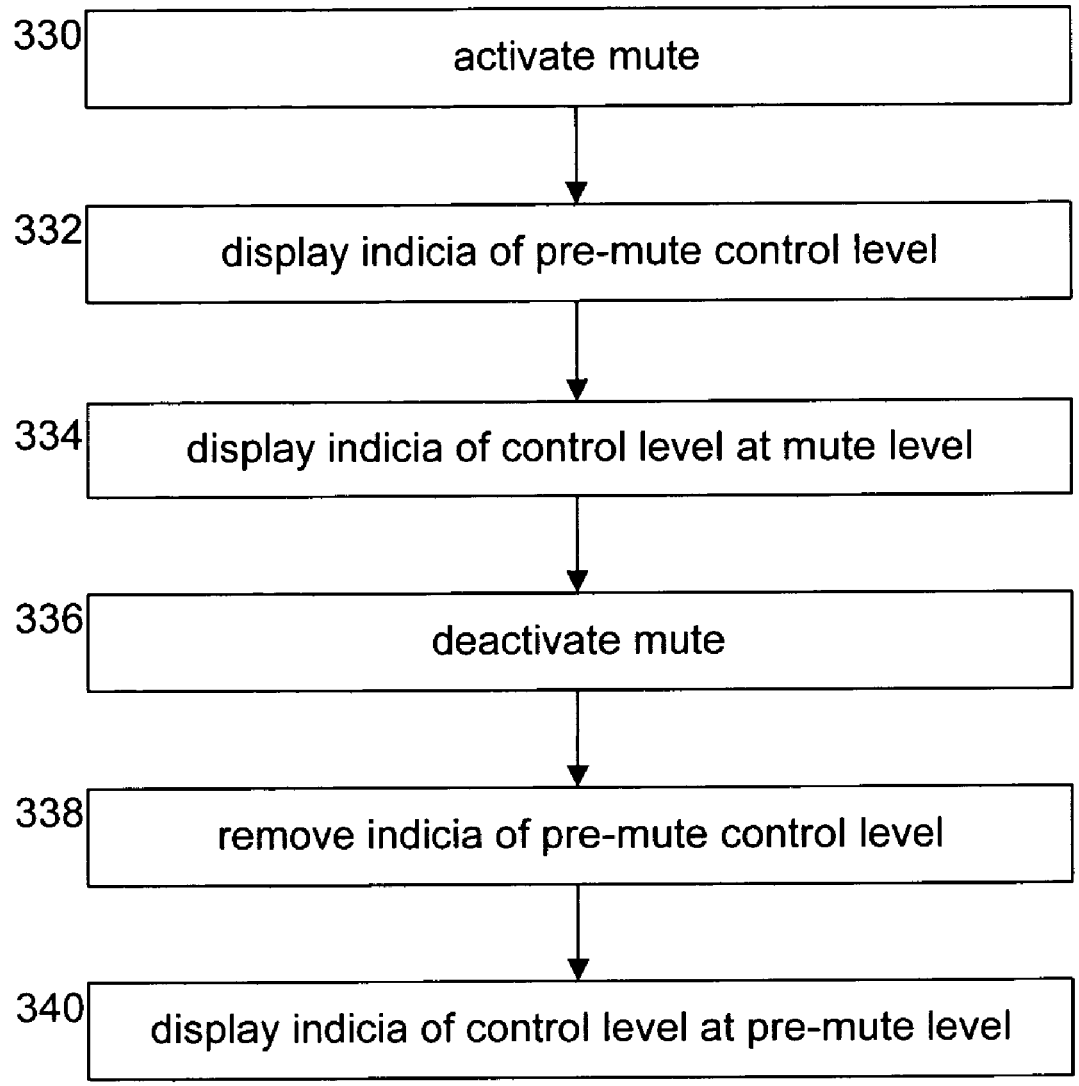
FIG. 13 shows a process for providing a volume control with an integrated mute indicator.

FIG. 13 shows a process for providing a volume control with an integrated mute indicator. Muting is activated 330, either by direct interaction with the volume control or by some external means such as a global mute command or an automatically triggered muting signal. In response, indication of a pre-mute control level is displayed 332. For example, a ghosted slider tab, a line, a shaded region, a ghosted bar, or any other marker may be used to display the pre-mute control level within or as part of the interface component that actually controls the volume level. An indicator of the muted control level is displayed 334 in further response to the mute occurrence or activation 330. The muted control level indicator is preferably displayed to correspond to the mute level. The muted control level may be a zero-level setting which prevents the volume control from outputting an audio signal. The muted control level can also be a low-level setting (e.g. 5%) which would be reflected by the mute-level indicator. When the mute state is deactivated 336, the pre-mute control level indicator may be removed 338, undisplayed, converted into an ordinary volume control level indicator, or overlaid by the repositioned mute-level indicator, which is displayed 340 at the pre-mute level when the mute state is deactivated 336.

Figure 14:
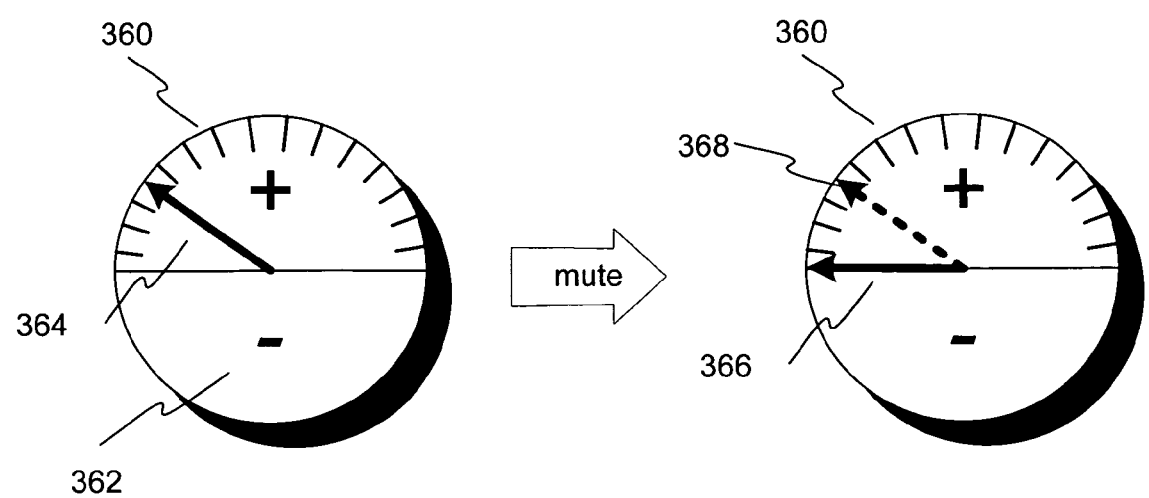
FIG. 14 shows another example of a volume control with integrated mute-state information.

FIG. 14 shows another example of a volume control 360 with integrated mute-state information. In the example of FIG. 14 the volume control 360 has buttons 362 (semicircle with a "+", semicircle with a "−") for raising and lowering the volume control level. The volume control level is indicated by speedometer-like arrow 364. When muting occurs the arrow 364 is moved to a mute position 366 and another indicator or arrow 368 is displayed at the pre-mute level. This pre-mute indicator or arrow 368 preferably has an appearance to signify that it represents an inactive control level of the volume control, that is, a control level that the volume control will revert to if unmuted. For example, the pre-mute indicator or arrow 368 may be ghosted, dashed, faint, smaller, etc.

Other Embodiments

Figure 15:
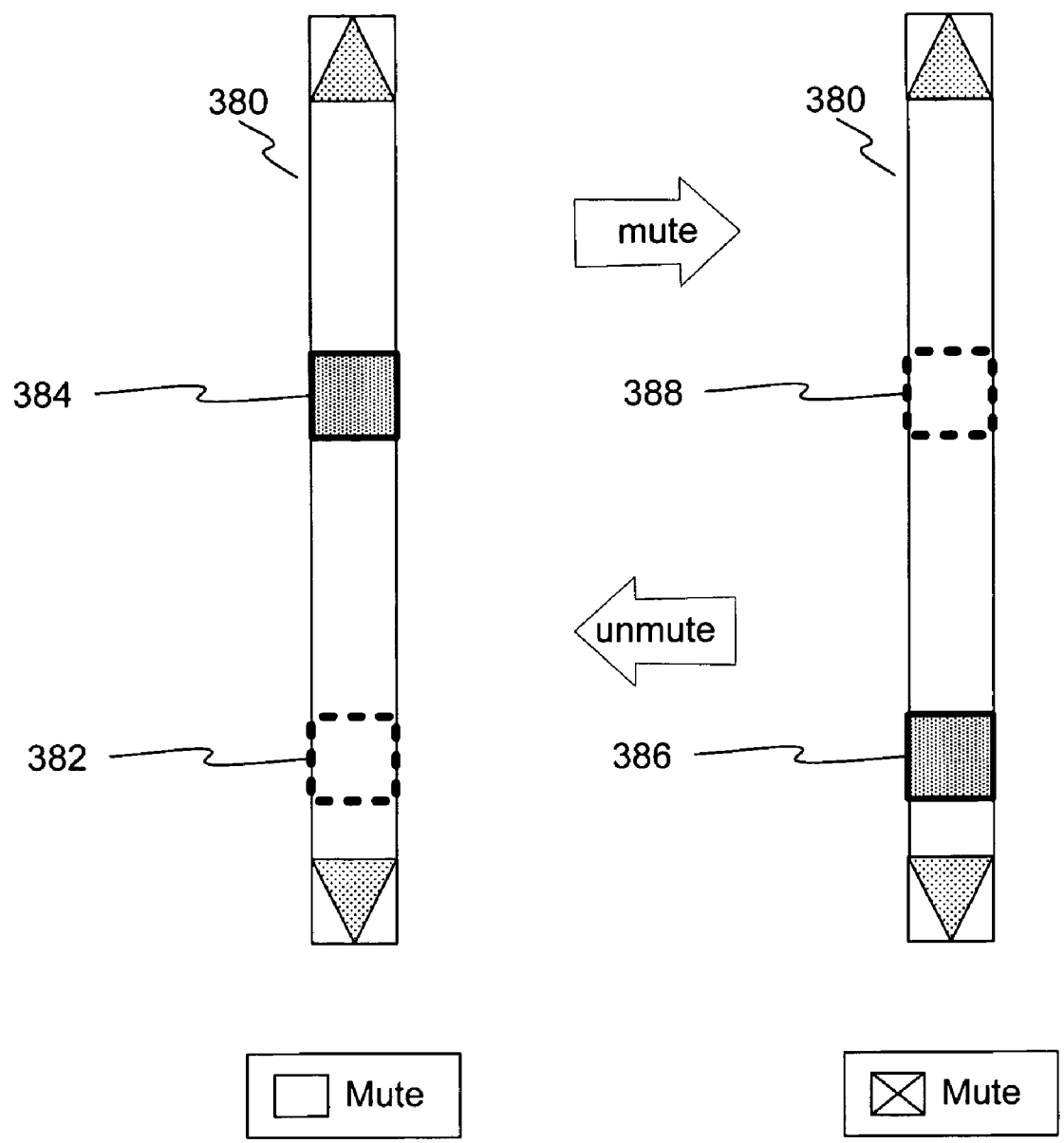
FIG. 15 shows a volume control with a persistent mute-level indicator.

FIG. 15 shows a volume control 380 with a persistent mute-level indicator 382. In this embodiment when the volume control 380 is in an unmuted state a mute-level indicator 382 is displayed and a volume level indicator 384 is also displayed. The mute-level indicator 382 can be adjusted. When muting occurs a non-ghosted indicator 386 is displayed at the level of the mute-level indicator 382 and a ghosted indicator 388 is displayed at the level of the volume level indicator 384. When the volume control 380 is unmuted the indicators revert as shown on the left side of FIG. 15. The level indicators may be slider tabs or other types of user interface elements. The mute checkbox is not needed. If either or both indicators 382, 384 are also adjustable by user input, then either or both indicators 382, 384 can be implemented so that moving an indicator 382, 384 invokes its corresponding function; e.g. dragging mute-level indicator 382 can trigger a mute command, and dragging volume level indicator 384 can trigger an unmute command.

Figure 16:
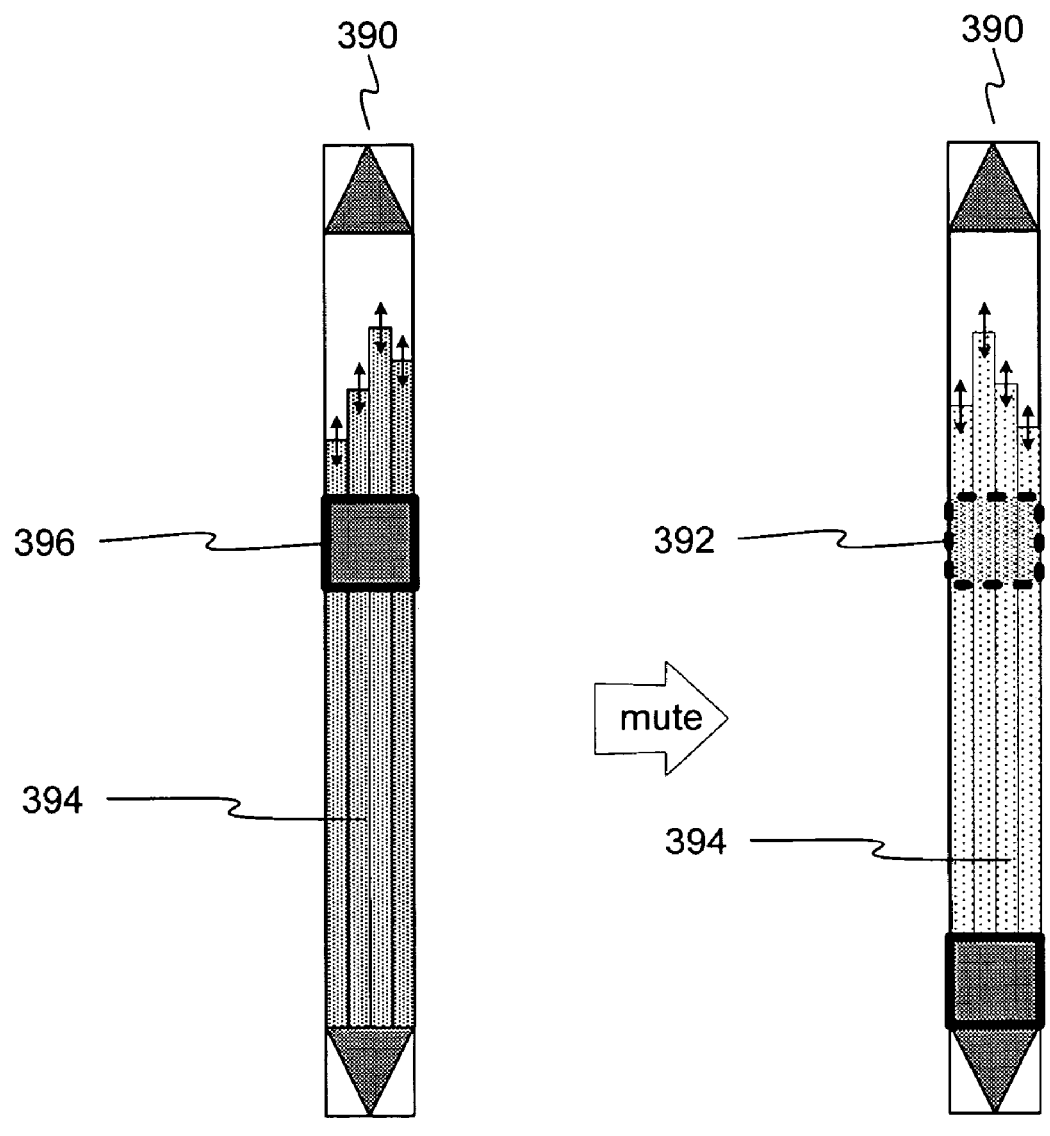
FIG. 16 shows a volume control with combined mute level indication and integrated audio signal indication.

FIG. 16 shows a volume control 390 with combined mute level indication 392 and integrated audio signal indication 394. When the volume control 390 is muted the pre-mute control level is indicated by indicator 392. The pre-mute control/indicator 396 can be ghosted to produce indicator 392. Furthermore the appearance of integrated audio signal indication 394 can be changed to reflect the muted state. For example the audio signal indication 394 can be lightened, displayed with a different color, or otherwise altered to indicate to a user that the volume control 392 is in a muted state. A user can view volume control 390 and quickly determine whether the volume control 390 is in a muted state, whether the volume control 390 is receiving an audio signal, and if muted what level the control level is when the volume control 390 is unmuted. Furthermore, as discussed above with reference to FIG. 12, the transition to a mute state from a non-mute state may be accomplished by use of a volume animation where the volume state gradually ramps slowly (over say 200 ms to 1 s) from its current state to "0" or the mute state. The slider can animate in direct relation to the changing volume state. By unchecking a mute checkbox, the slider can then re-animate back to its previous state thereby providing a smooth "volume ramp" rather than switching quickly via an abrupt or potentially unsettling step function.

Figure 17:
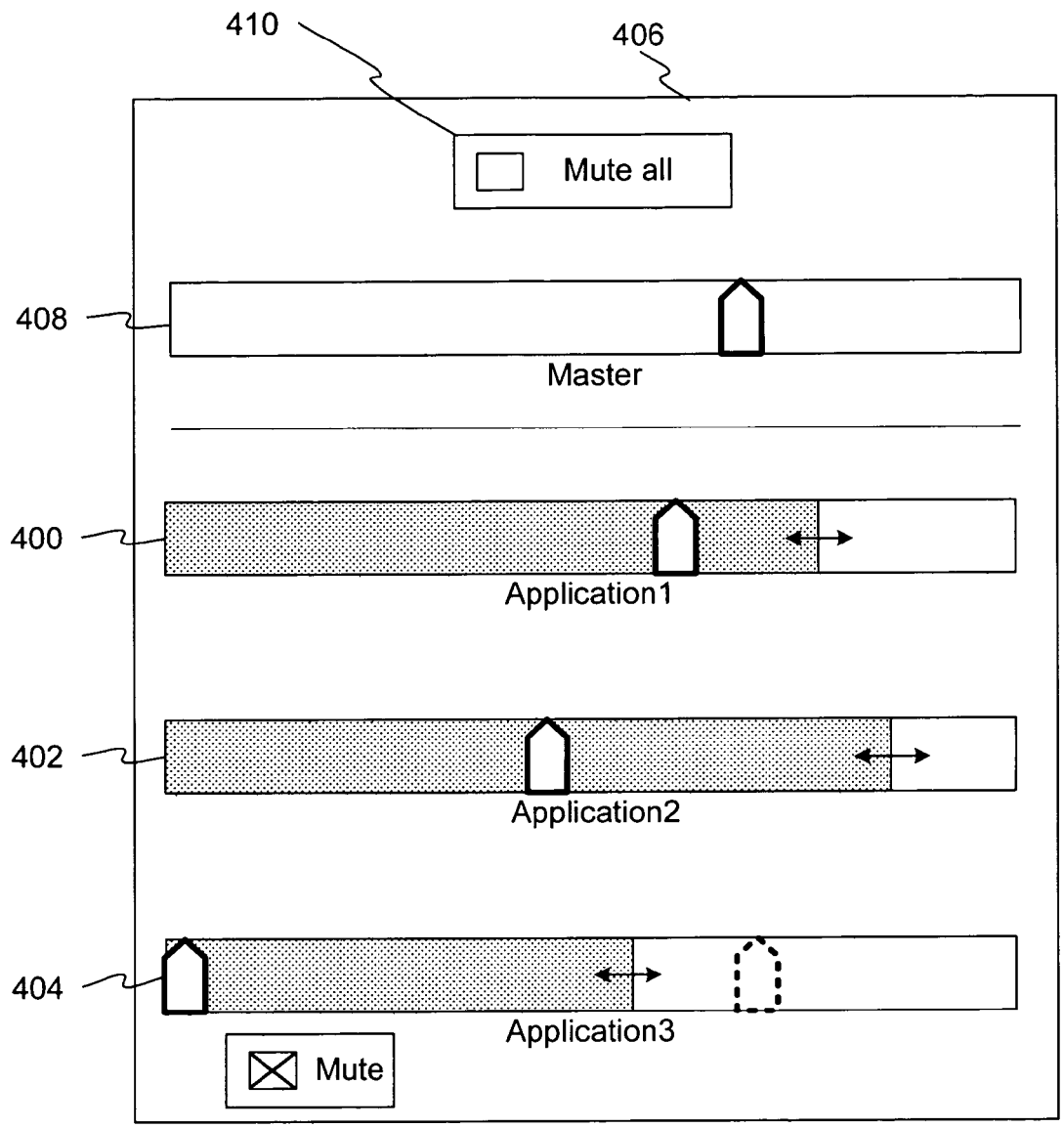
FIG. 17 shows how features discussed above can be used in a multi-control system.

FIG. 17 shows how features discussed above can be used in a multi-control system. In FIG. 17 three applications have respective volume controls 400, 402, and 404, which are displayed in a common user interface panel 406. Also in panel 406 are a master volume control 408 and a master mute switch 410. The individual volume controls 400, 402, and 404 can be adjusted individually and can be implemented with any of the features discussed above. For example, volume controls 400, 402, and 404 have an integrated signal meter and volume control 404 has a ghosted mute level indicator. The master volume control 408 can also be implemented as discussed above. However, when the master volume control 408 is adjusted the volume controls 400, 402, and 404 are automatically adjusted accordingly. The master volume control 408 may not even directly handle an audio signal but rather may indirectly regulate the audio signal of the other volume controls 400, 402, and 404. A similar arrangement can be used with a mixing or equalizing application where each volume control controls a different component of a same audio signal. In such an arrangement, it may be helpful to have the mute state of the final volume control in the path feed back to the previous (upstream) application controls so that even the application controls further back in the chain have a visual indication that their signal is not making it to the speakers. In this case, a ghost slider state would provide detail of current setting, while the actual slider state (moved to "0") indicates the actual perceived user volume of each signal or application in the mix.

SUMMARY

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like. Furthermore, those skilled in the art will also appreciate that no further explanation is needed for embodiments discussed to be implemented on devices other than computers. Devices such as appliances, televisions, portable media players, or any device with a display and a need to control an audio signal can be readily designed with features discussed above.

All of the embodiments and features discussed above can be realized in the form of information stored in volatile or non-volatile computer readable medium. This is deemed to include at least media such as CD-ROM, magnetic media, flash ROM, etc., storing machine executable instructions, or source code, or any other information that can be used to enable a computing device to perform the various embodiments. This is also deemed to include at least volatile memory such as RAM storing information such as CPU instructions during execution of a program carrying out an embodiment.

Those skilled in the art will also realize that a variety of well-known types of computing systems, networks, and hardware devices, such as workstations, personal computers, PDAs, mobile devices, and so on, may be used to implement embodiments discussed herein. Such systems and their typical components including CPUs, memory, storage devices, network interfaces, operating systems, application programs, etc. are well known and detailed description thereof is unnecessary and omitted.

The invention claimed is:

1. A volatile or non-volatile storage storing information for enabling a device to display on a display a user interface of a volume control, the device rendering an electric audio signal comprised of audio signal fluctuations and emitting corresponding sound fluctuations from a loudspeaker, the volume control having a variable control level that controls the volume of the sound coming from the loudspeaker such that when the variable control level is raised or lowered amplitudes of the fluctuations are correspondingly raised or lowered, the user interface comprising:

a graphical interface component that is displayed on the display and that varies the control level in accordance with interactive user manipulation of the graphical interface component, where the graphical interface component responds to user manipulation thereof at any given time while the device is rendering the electric audio signal to raise or lower the amplitude of the sound fluctuations emitted from the loudspeaker, the graphical interface component comprising a displayed signal indication graphic that is graphically united on the display with the graphical interface component, the signal indication graphic having an appearance on the display that fluctuates in accordance with the audio signal fluctuations as the corresponding sound fluctuations are emitted from the loudspeaker, where the signal indication graphic is displayed within at least a portion of the graphical interface component that is manipulated by the user to vary the control level.

2. A volatile or non-volatile storage according to claim 1, wherein the graphical interface component comprises a slider.

3. A volatile or non-volatile storage according to claim 1, wherein the signal indication graphic further indicates whether or not the graphical interface component is in a muted state.

4. A volatile or non-volatile storage according to claim 1, wherein the graphical interface component changes appearance on the display as the graphical interface component is interactively manipulated by the user.

5. A volatile or non-volatile storage according to claim 1, wherein the signal indication graphic and the graphical interface component are united such that a change in appearance of one effects a change in appearance of the other.

6. A device comprising a display unit, the device, when operating, displays a volume control widget on the display, wherein when displaying the volume control widget: when muting occurs in response a first audio level indicator is displayed in the volume control widget to indicate a muted audio level and a second audio level indicator is displayed in the volume control widget to indicate a pre-muted audio level.

7. A device according to claim 6, wherein the device is further configured such that when unmuting occurs the first audio level indicator is no longer displayed to indicate the muted audio level and either or both audio level indicators are displayed at the pre-muted audio level.

8. A device according to claim 7, wherein the volume control widget comprises a slider, first audio level indicator comprises a slider tab, the second audio level indicator comprises a ghosted slider tab, and both slider tabs are displayed on the slider.

9. A device according to claim 6, wherein the first audio level indicator comprises a slider tab and the second audio indicator comprises a ghosted slider tab.

10. A device according to claim 6, wherein the volume control, when displayed, also includes graphic information integrated therewith that indicates the presence and/or level and state of an audio signal that the volume control widget is controlling.

11. A method comprising:

displaying a volume control that comprises an area receptive to stroke, drag, or click inputs to raise or lower a setting that raises or lowers a level of an audio signal regulated by the volume control; and receiving a mute command and in response: muting the audio signal, displaying in the area receptive to stroke, drag, or click inputs a first marker indicating the value of the setting prior to the muting, and displaying in the area receptive to stroke, drag, or click inputs a second marker indicating a muted value of the setting.

12. A method according to claim 11, further comprising:

receiving an unmute command and in response: unmuting the audio signal, displaying one of the markers to indicate the value of the setting prior to the muting and undisplaying, hiding, or changing the appearance of the other marker.

13. A method according to claim 12, wherein the unmute command comprises moving the first marker with a stroke or drag command.

14. A method according to claim 12, wherein the other marker is changed in appearance and the change in appearance comprises displaying the other marker with a ghosting or alpha-blended overlay effect or other such dual state indicator.

15. A method according to claim 11, wherein when the audio signal changes the appearance of the volume control changes accordingly.

16. A method according to claim 15, wherein the changing of the appearance comprises a metering effect, or a change in color or brightness, or a change in shape of a part of the area of the volume control that is receptive to stroke, drag, or click inputs.

17. A method according to claim 11, wherein displaying the second marker comprises displaying an animation to give an appearance of a marker, either the second marker or another marker, moving from the position of the first marker to a position indicating the muted value of the setting.

18. A method according to claim 17, wherein the muting the audio signal comprises gradually lowering the level of the audio signal.

19. A method according to claim 11, wherein the muting the audio signal comprises gradually lowering the level of the audio signal.

* * * * *